(12) United States Patent
Sikora et al.

(10) Patent No.: US 7,044,286 B2
(45) Date of Patent: May 16, 2006

(54) METHOD OF SEPARATING STREAMS OF DISPLACING MULTI-LAYERED STACKS OF RODLIKE ELEMENTS AND VALVE DEVICE FOR SEPARATING STREAMS OF MULTI-LAYERED STACKS OF RODLIKE ELEMENTS

(75) Inventors: Leszek Sikora, Radom (PL); Radoslaw Owczarek, Radom (PL)

(73) Assignee: International Tobacco Machinery Poland Ltd., Radom (PL)

( * ) Notice: Subject to any disclaimer, the term of this patent is extended or adjusted under 35 U.S.C. 154(b) by 5 days.

(21) Appl. No.: 10/477,229

(22) PCT Filed: May 23, 2002

(86) PCT No.: PCT/PL02/00033

§ 371 (c)(1),
(2), (4) Date: Jun. 28, 2004

(87) PCT Pub. No.: WO02/096227

PCT Pub. Date: Dec. 5, 2002

(65) Prior Publication Data

US 2004/0231961 A1    Nov. 25, 2004

(30) Foreign Application Priority Data

May 25, 2001    (PL)    ..................... 347731

(51) Int. Cl.
B65G 47/26    (2006.01)

(52) U.S. Cl. ................ 198/457.05; 198/347.1

(58) Field of Classification Search ............. 198/347.1, 198/367, 457.05, 364, 368, 369.1
See application file for complete search history.

(56) References Cited

U.S. PATENT DOCUMENTS

| | | | |
|---|---|---|---|
| 3,995,732 A | 12/1976 | Bowen et al. | |
| 4,023,669 A | 5/1977 | Clarke | |
| 4,042,094 A * | 8/1977 | Schmermund | ........... 198/347.1 |
| 4,366,895 A * | 1/1983 | Bennett et al. | .......... 198/347.1 |
| 4,795,020 A | 1/1989 | Carter et al. | |
| 5,217,101 A | 6/1993 | Rachka | |

* cited by examiner

Primary Examiner—James R. Bidwell
(74) Attorney, Agent, or Firm—Westerman, Hattori, Daniels & Adrian, LLP

(57) ABSTRACT

A method and device is provided that separates non-parallel streams of displacing multi-layered stacks of rod-like elements which fill a horizontal conveyor (wherein the elements are displaced by force) and a channel positioned at an angle (wherein the elements are displaced by gravity.) The inside dimensions of the cross sections of the conveyor and the channel allow an equal flow of the elements. To separate the streams, the elements are removed from the adjoining area of the conveyor and the channel, wherein the stack of the elements is a passive stream, to the area of the conveyor or the channel, wherein the stack is an active stream. The space that is taken up by the removed elements equals the space of one quarter of the radius of the cylinder, wherein the walls of the cylinder that are parallel to the axis of the cylinder, separate multi-layered non-parallel streams of the elements.

9 Claims, 4 Drawing Sheets

METHOD OF SEPARATING STREAMS OF DISPLACING MULTI-LAYERED STACKS OF RODLIKE ELEMENTS AND VALVE DEVICE FOR SEPARATING STREAMS OF MULTI-LAYERED STACKS OF RODLIKE ELEMENTS

The subject of the invention is a method of separating of displacing non-parallel streams of rod-like elements, especially for tobacco industry products, and a valve device for separating the said streams.

In production lines of rod-like products of tobacco industry such as cigarettes or filter rods in the production process the said products are transported a long method after exiting the making machine before they become packed in a packing machine or placed in stores. The transporting is usually realized in a multi-layered ordered stack. There is a necessity to handle the stream of the products in order to deliver them to various machines in a production line. Cigarettes or filter rods are transported on horizontal conveyors. Cigarettes can be delivered onto the conveyors and collected from the conveyors via channels positioned at angles to the horizontal conveyors, the channels can connect various horizontal conveyors. The rod-like products fill the conveyors and the channels to an extent, which assures correct flows of the products. During displacing the said products along the horizontal conveyor over the bottom layer or under the bottom layer of the rod-like elements in the channels or while changing direction of a stream from vertical to horizontal or from horizontal to vertical, the products of the outer layer of the active stream roll along the outer layer of the passive stream finding itself in the adjoining channel or conveyor, which usually causes degradation of the products in the adjoining area, which will be rejected in further production process and bring significant losses.

Conventional engineering devices for changing direction of mass flow of rod-like products are generally known in tobacco industry. For example in the description of the German patent No. 3.530.028 an assembly for changing direction of flow with the angle of 900 has been presented, the task of the assembly is to deliver the products of tobacco industry to a filling machine. The assembly is equipped with a cover, which acts as an elastic membrane connected to two covers rotary assembled on two neighboring axes. After an increased amount of products has been gathered in the area of outlet flow in vertical plane, the membrane is pressed at the bottom, which while drawing back causes opening the covers, which increases the volume of the container above the vertical channel.

Modification of this solution disclosed in the description of the German patent application No. 19.938.542 is based on elimination of the membrane and exchanging it with a cover shaped of two parts joined kinematically so that the inside measurements of the cross section of the cover follow automatically the changes of flow of rod-like products in the assembly of changing direction of flow of rod-like products.

U.S. Pat. No. 4,507,040 describes a method of transporting and a device for transporting cigarettes or rod-like products between a making machine and a packing machine. The route of cigarettes has been described in details and especially the change of direction of a stream from horizontal to vertical and the method of controlling of closing an outlet into a vertical channel, the task of the channel is to lead cigarettes into an intermediate store in certain cases that is in order to remove them from the adjoining area, where degradation of cigarettes is caused by rolling them. The removed cigarettes are replaced by the appropriate amount of products delivered in farther section of the horizontal conveyor. describes a device for handling rod-like products, wherein a trail has been made in order to apply a moving plate in the method of horizontal stream of rod-like products, which separates the stream from vertical channel. The invention presents various technical solutions of the same plate as well as means for driving the plate. However, one problem is the risk of damaging the rod-like products while placing the plate horizontally into the channel filled with the products.

SUMMARY OF THE INVENTION

In accordance with the present invention, the essential feature of the method of separating a stream of displacing stack of rod-like elements filling a horizontal conveyor, in which the displacement of elements is forced, from a stream of displacing stack of rod-like elements filling a channel positioned at an angle to the conveyor, in which the displacement of the elements is forced by gravity, wherein the inside dimensions of the passages in the cross sections of the horizontal conveyor and the channel positioned at an angle enable equal flow intensities, constitutes in the removal of rod-like elements from the adjoining area of the conveyor or the channel, the rod-like elements in which become the passive stream, to the area of the channel or the conveyor, the rod-like elements in which become the active stream. The space taken by the removed elements is equal to the volume of one quarter of a cylinder of radius, which corresponds to the width of the conveyor or the channel, whereas the walls of the sector of the cylinder, which are parallel to the axis of the cylinder separate the non-parallel streams of multi-layered stacks of rod-like elements. In the case where the multi-layered stack of rod-like elements in the channel becomes the passive stream, elements are removed from the adjoining area to the pocket above the conveyor formed by movable parts of the upper walls of the conveyor above the channel.

Another characteristic of the method of separating the stream of displacing stack of rod-like elements filling the horizontal conveyor from the stream of displacing stack of rod-like elements filling the channel placed at an angle to the conveyor, in which the displacement of the elements is forced by gravity, wherein the inside dimensions of the passages in the cross sections of the horizontal conveyor and the channel positioned at an angle enable equal flow intensities, constitutes in the shutting the elements placed in the adjoining area of the streams in the conveyor or a channel, the rod-like elements in which become the passive stream, in a recess the shape of which corresponds to the cross section of the conveyor or channel, whereas the recess is made in a rotary assembled cylinder crosswise the axis of the cylinder, whereas the symmetry plane of the recess overlaps the axis of rotation of the cylinder and the axis of the cylinder is placed in the symmetry plane of the conveyor or the channel. The shutting of the rodlike elements is realized by turning the cylinder.

The variations of the method of separating streams eliminates degradation of the outer layer of the rod-like elements in the passive stream, moreover they constitute the facility to displace the rod-like elements at the desired speeds. Removing the elements from the passive to the active stream protects from increased pressure in the stream and the effect is also helped by applying a special pocket in appropriate variation. Removing the elements from the adjoining area does not disturb their orientation, that is the rod-like elements are positioned parallel to each other which is a condition of mass flow in tobacco industry. The space created after removing the elements becomes taken by a wall of a cylinder of specially calculated dimensions, along the wall the multi-layered stack of elements can displace without disturbing continuity of the stream.

The essence of the valve device according to the invention of separating streams of multi-layered stacks of rod-like elements placed in the area of crossing the horizontal conveyor equipped with a moving band and the channel positioned at an angle, equipped with non-moving walls, whereas the inside dimensions of the cross sections of the passages of the conveyor and the channel are the same, constitutes the construction of the rotary valve placed in the area of crossing the horizontal conveyor and the channel. The valve is shaped as a sector of a cylinder of radius corresponding to the width of the horizontal conveyor and the width of the channel and height corresponding to the length of the rod-like elements, whereas the axis of rotation of the valve is the axis of the cylinder and overlaps a line of intersection of a plane of the upper wall of the horizontal conveyor and a plane of the side wall of the channel positioned at an angle. It is mostly required that the valve constitutes a half of a cylinder.

The essence of the variation of the valve device for separating streams of multi-layered stacks of rod-like elements placed in the area of crossing the horizontal conveyor equipped with a moving band and the channel positioned at an angle, equipped with non-moving walls, whereas the inside dimensions of the passages of the cross sections of the conveyor and the channel do not equal, constitutes the construction of the rotary valve placed in the area of crossing the horizontal conveyor and the channel. The valve is shaped as a sector of a cylinder of radius corresponding to the width of the channel and height corresponding to the length of the rod-like elements, whereas the axis of rotation of the valve is the axis of the cylinder and overlaps the line of intersection of a plane of the lower wall of the horizontal conveyor and a plane of the side wall of the channel positioned at an angle. It is mostly required that the valve constitutes one quarter of a cylinder. Above the upper wall of the horizontal conveyor there is a pocket above the channel, shaped by hinge assembled parts of the upper wall of the horizontal conveyor driven by the pressure of the rod-like elements.

The essence of another variation of the valve device for separating streams of multi-layered stacks of rod-like elements placed in the area of crossing the horizontal conveyor equipped with a moving band and the channel positioned at an angle, equipped with non-moving walls, constitutes the construction of the rotary valve shaped as a cylinder, the rotation axis of which is placed in the symmetry plane of the channel and/or the horizontal conveyor, at a distance from the line of intersection of a plane of the side wall of the channel with a plane of the wall of the horizontal conveyor, which is equal to the radius or slightly bigger than the radius of the cylinder. Within the cylinder which constitutes the rotary valve there is a through recess, the shape of which corresponds to the cross section of the horizontal conveyor or the channel and the axis of rotation is positioned in the symmetry plane of the recess.

The advantage of all variations of the valve according to the invention is the possibility of removing the rod-like elements from the adjoining area of two non-parallel streams without disturbing the well-ordered stacks within the range of applied speeds of the streams. At the same time the side walls of the valve shut the passive stream and become side walls for the active stream. After next turning of the valve, which will result in placing the valve in previous position, well-ordered and not deformed rod-like elements from the passive stream join the active stream.

BRIEF DESCRIPTION OF THE DRAWINGS

The subject of the invention has been presented as realization examples.

DETAILED DESCRIPTION OF THE INVENTION

Figure 1:
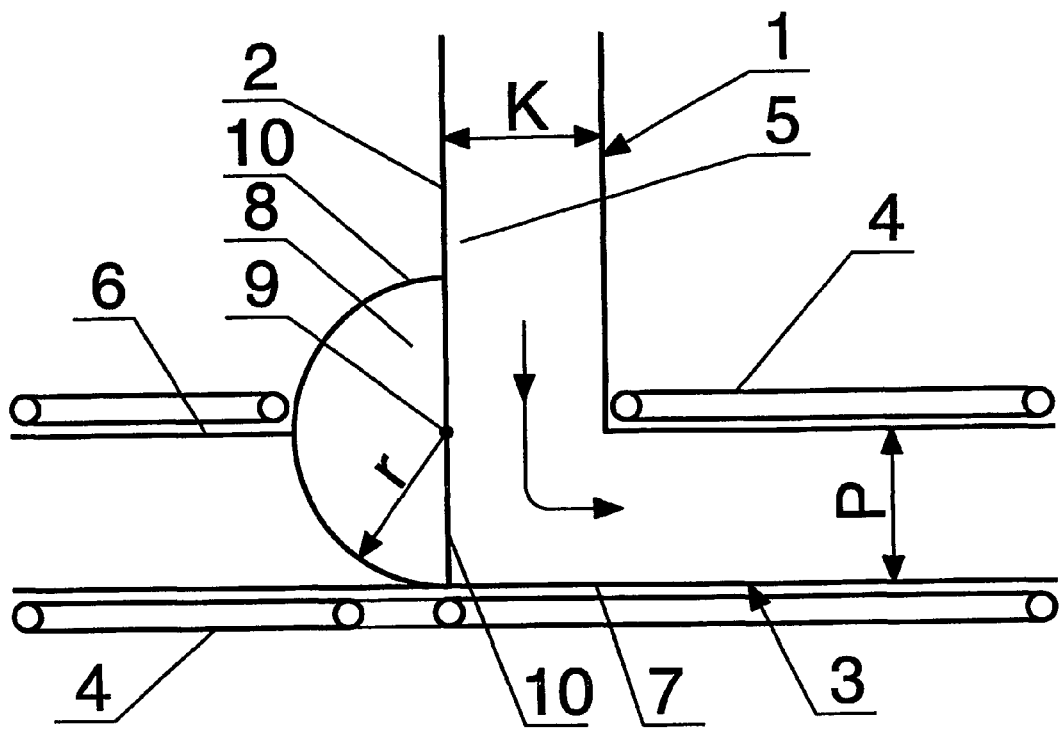
FIG. 1 is a diagram of a valve consisting of a half of a cylinder in a position, which allows the change of direction of the active stream, situated in the crossing area of the horizontal conveyor and the channel of equal inside dimensions of the passages of cross sections of the conveyor and the channel.
Figure 2:
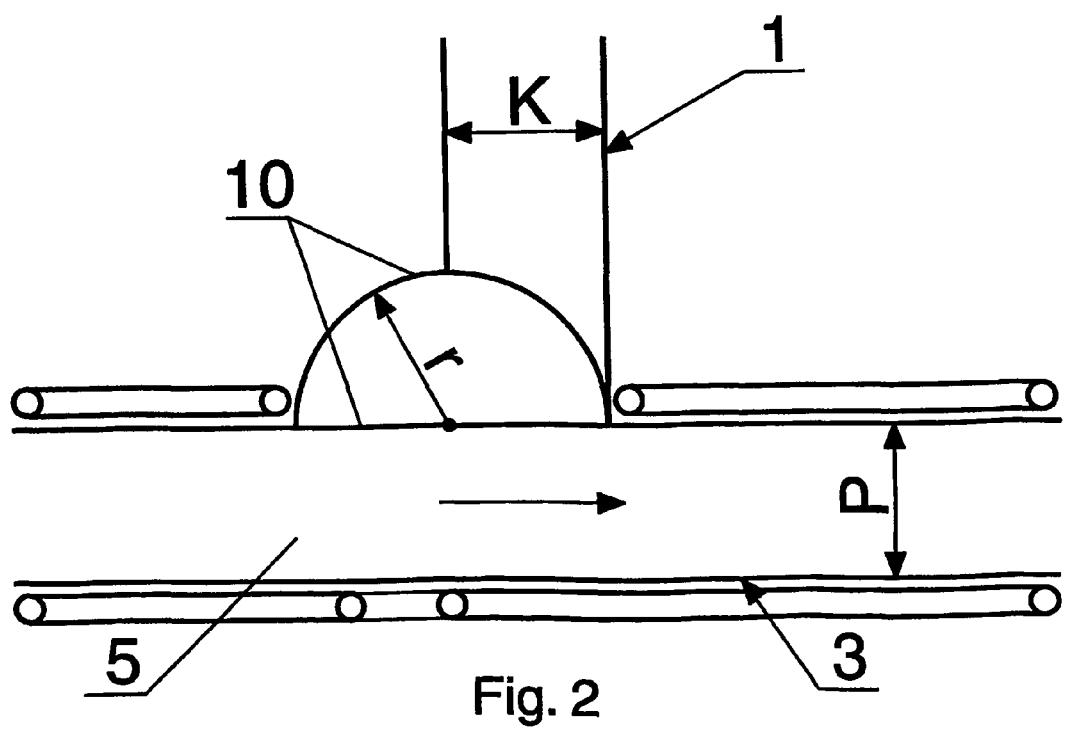
FIG. 2 is a diagram of the valve of FIG. 1 in a position which allows the flow of the active stream only along the horizontal conveyor.

According to the invention as shown in FIG. 1 and FIG. 2, a vertical channel 1 of width K equipped with non-moving side walls 2 is positioned over a horizontal conveyor 3 of width P equipped with a moving band 4, used for forcing the displacement of the multi-layered ordered stack 5, which overlaps a plane of an upper wall 6 and a plane of a lower wall 7 of the horizontal conveyor 3, whereas the width P of the conveyor 3 and the width K of the channel 1 are equal. In the area of crossing the channel 1 and the horizontal conveyor 3 is placed a rotary valve which consists of a half of a cylinder of radius r which corresponds to width P of the horizontal conveyor and of height corresponding to the length of the rod-like elements in stack 5. An axis of rotation 9 of a valve 8 is the axis of the cylinder and overlaps the line of intersection of the plane of the upper wall plane 6 of the horizontal conveyor 3 with the plane of the side wall 2 of the channel 1, whereas walls 10 of the valve 8, which are parallel to the axis of the cylinder, separate the rodlike elements of the active and passive streams.

In the case when the active stream of the stack 5 displaces in the channel 1 to the right part of the horizontal conveyor 3, the valve 8 shuts the left side of the of the conveyor 3 with its wall 10 and the flat surface of the wall 10 constitutes a lengthening of the side wall 2 of the channel 1. When changing the direction of the active stream to horizontal, the clockwise turning valve 8 moves the rodlike elements from the adjoining area of the channel 1 into the horizontal conveyor 3 with the flat surface of the wall 10, which does not increase the pressure in the stream as at the same time an empty space is created after retreating the second part of the valve 8 from the area of the conveyor 3, which can be taken by elements from the channel 1. At the same time the round wall 10 of the valve 8 separates the stack 5 of the elements in upper part of the channel 1.

Figure 3:
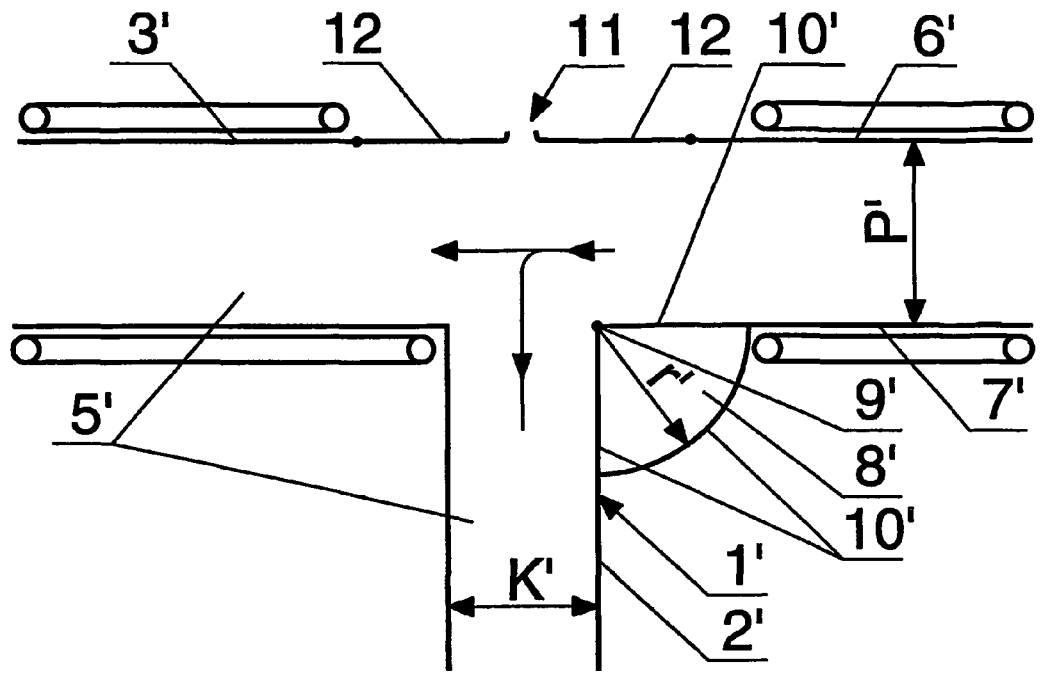
FIG. 3 is a diagram the valve consisting of one quarter of a cylinder in a position, which allows the flow of the active stream along the horizontal conveyor and the channel, positioned in the area of crossing the horizontal conveyor and the channel, whereas the inside dimensions of the passages of the cross sections of the conveyor and the channel are not equal.
Figure 4:
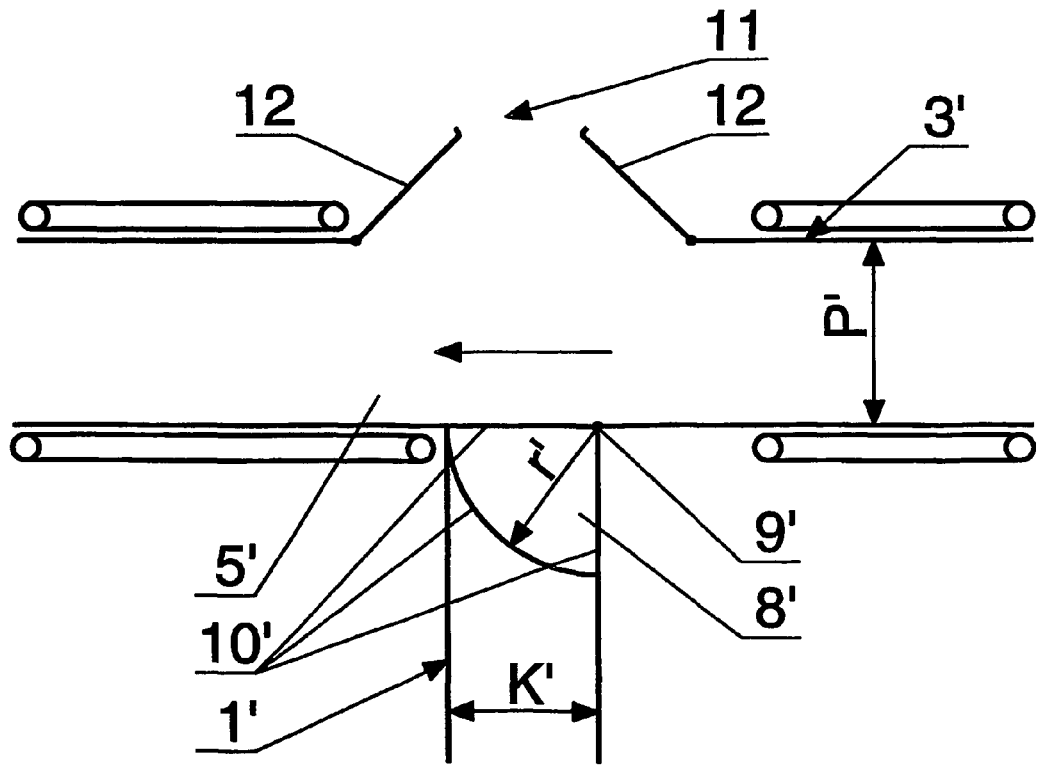
FIG. 4 is a diagram of the valve of FIG. 3 in a position which allows the flow of the stream only along the horizontal conveyor.

In another variation of the invention shown in FIG. 3 and FIG. 4, a vertical channel 1' of width K' is situated underneath a horizontal conveyor 3' of width P', whereas the width P' of the conveyor 3' is bigger than the width K' of the channel 1'. In the area of crossing the horizontal conveyor 3' and the channel 1' is positioned a rotary valve 8' in form of one quarter of a cylinder of radius r' corresponding to the width K' of the channel 1' and of height corresponding to the length of rodlike elements in a stack 5'. An axis of rotation 9' of the valve 8' is the axis of the cylinder and overlaps the line of intersection of a plane of a lower wall 7' of the horizontal conveyor 3' with a plane of a side wall 2' of the channel 1'. In an upper wall 6' of the horizontal conveyor 3' there is a pocket 11 shaped by two movable parts 12 hinge assembled at the upper wall 6'. Walls 10' of the valve 8', which are parallel to the axis of the cylinder, separate the rod-like elements of active and passive streams.

In the case when the active stream of the stack 5 displaces along the horizontal conveyor 3' and a part of the stream is collected by the channel 1', the valve 8' is hidden and a straight installment of the wall 10 constitutes a lengthening of the side wall 2 of the channel 1'. In order to eliminate the flow into the channel 1' and to continue the flow of the active stream in the horizontal conveyor 3', the clockwise turning valve 8' moves the rod-like elements from the adjoining area of the channel 1' into the horizontal conveyor 3' with the straight installment of the wall 10'. The pressure which is generated in the active stream is immediately eliminated due to the pocket 1, which becomes filled because of the pressure of the elements displaced by the valve 8', whereas the volume of the pocket 11 corresponds to the volume taken by the valve 8' in the channel 1'. This state lasts for a very short time because the rod-like elements will be transferring from the pocket 11 into the displacing stack 5' until the parts 12 return to the position, where they overlap the plane of the upper wall 6'. At the same time the round wall 10' of the valve 8' separates the stack 5' in the channel 1'.

Figure 5:
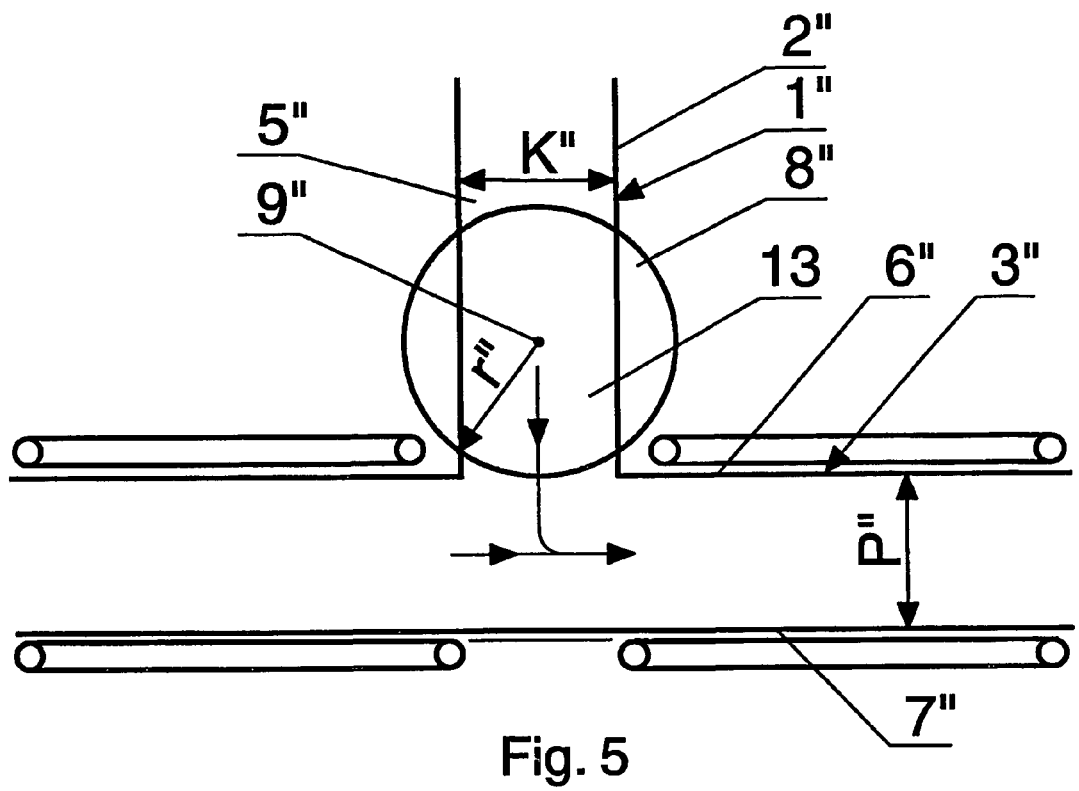
FIG. 5 is a diagram valve consisting of a cylinder near the outlet of the channel into the horizontal conveyor in an opened position which allows the flow of the active stream from the channel into the horizontal conveyor.
Figure 6:
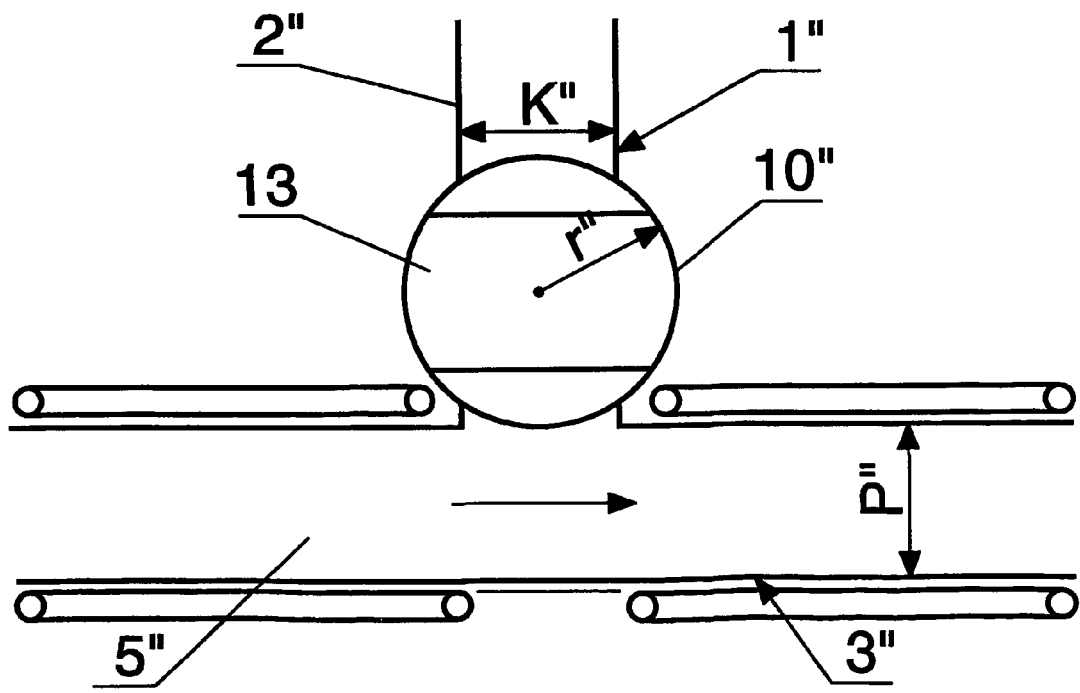
FIG. 6 is a diagram of the valve of FIG. 5 in a shut position which allows the flow of the active stream only along the horizontal conveyor.

In another variation of the invention shown in FIG. 5 and FIG. 6, in the area of crossing a horizontal conveyor 3" and a vertical channel 1" positioned above the conveyor 3", is placed a rotary valve 8" shaped as a cylinder of radius r". The axis of rotation 9" of the valve 8" is positioned in the symmetry plane of the channel 1" at a distance from the line of intersection of a plane of a side wall 2" of the channel 1" with a plane of an upper wall 6" of the horizontal conveyor 3" which is slightly bigger than the radius r" of the cylinder. Within the cylinder which constitutes the rotary valve 8" there is a through recess 13 of the shape and the inside dimensions of the cross section of the channel 1", whereas the axis of rotation 9" of the valve 8" is positioned in the symmetry plane of the recess 13.

In the case when an active stream of the stack 5" displacing along the channel 1" joins an active stream of the stack 5" displacing along the horizontal conveyor 3", the valve 8" is opened, so the recess 13 overlaps the channel 1". In case of necessity to separate the active stream in the channel 1" from the active stream in the horizontal conveyor 3", the valve 8" is rotated round the axis 9" with the angle of 90°.

The rod-like elements become shut in the recess 13 and at the same time the round wall 10" of the valve 8" separates the stack 5" in the upper part of the channel 1", on the other hand it constitutes a part of the upper wall 6" of the horizontal conveyor 3" in which the active stream is displacing.

Figure 7:
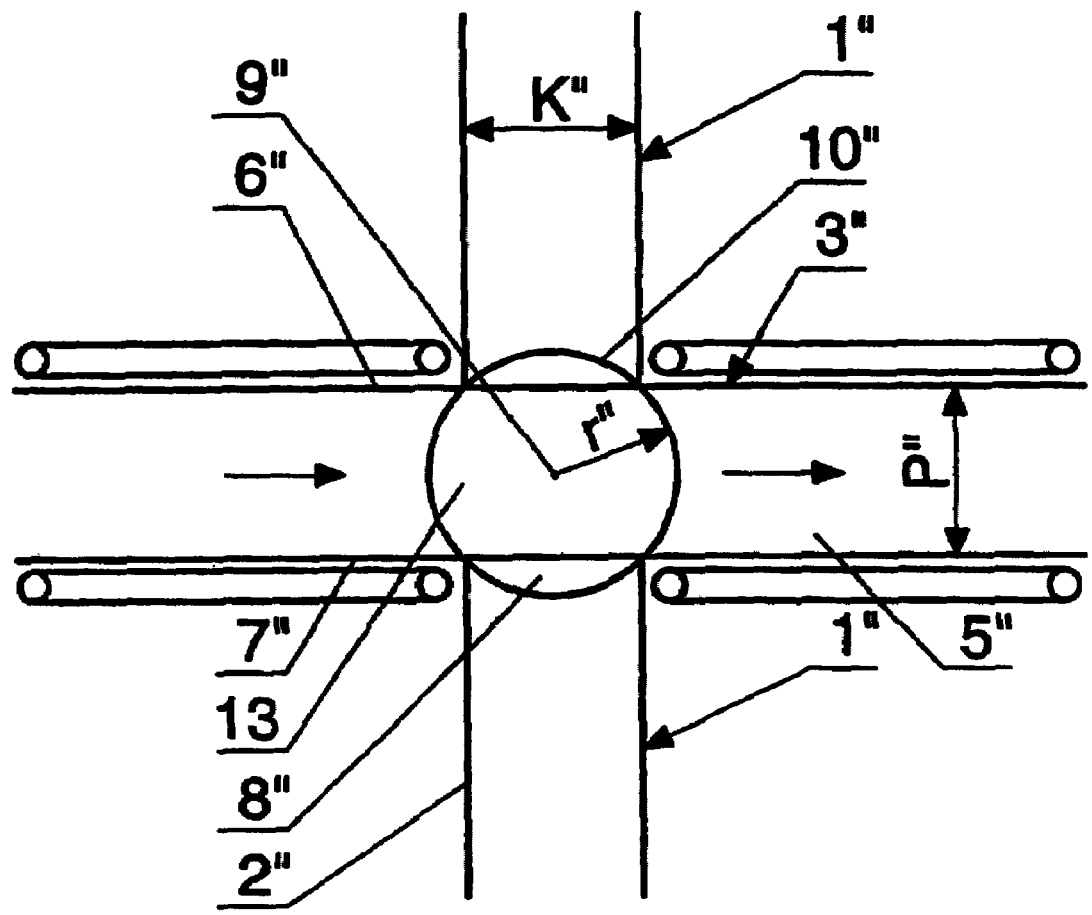
FIG. 7 is a diagram of the valve of FIG. 6 in a position where the axis of rotation of the valve overlaps the line of intersection of the symmetry plane of the horizontal conveyor with the symmetry plane of the channel.

In FIG. 7 a valve 8" is presented which is identical with the one in FIG. 5 and FIG. 6 but an axis of rotation 9" overlaps the line of intersection of the symmetry plane of the horizontal conveyer 3" with the symmetry plane of the channel 1". In this case the distances between the axis of rotation 9" and the lines of intersection of planes of the side walls 6" and 7" of the horizontal conveyor 3" are equal to the radius r" of the cylinder, whereas the widths P" and K" of the horizontal conveyor 3" and the channel 1" are equal.

The invention claimed is:

1. A method of separating non-parallel streams of displacing multilayered stacks of rod-like elements filling a horizontal conveyor, wherein the displacing of the elements is forced and a channel positioned at an angle, wherein the elements are displaced by gravity wherein the inside dimensions of the passages of the cross sections of the horizontal conveyor and the channel enable equal intensities of flows of rod-like elements, characterized in that in order to separate the streams the rod-like elements are removed from the adjoining area of the horizontal conveyor or the channel, in which the stack of the elements becomes a passive stream, to the area of the conveyor or the channel, in which the stack becomes an active stream and the space taken up by the removed elements equals the space of one quarter of a cylinder of radius equal to the width of the conveyor or the channel, wherein the walls of the cylinder which are parallel to the axis of the cylinder separate multi-layered non-parallel streams of rod-like elements.

2. The method according to claim 1, characterized in that the rod-like elements are removed from the adjoining area of the channel underneath the conveyor to a pocket shaped by movable parts at the upper wall of the conveyor above the channel.

3. A method of separating non-parallel streams of displacing multi-layered stacks of rod-like elements filling a horizontal conveyor, wherein the displacing of the elements is forced and a channel positioned at an angle, wherein the elements are displaced by gravity wherein the inside dimensions of the passages of the cross sections of the horizontal conveyor and the channel enable equal intensities of flows of rod-like elements, characterized in that in order to separate the streams the said rod-like elements in the adjoining area of the horizontal conveyor or the channel, in which the stack of the elements becomes a passive stream, are shut in a recess made in rotary assembled cylinder, where the cross section of the recess corresponds to the cross section of the conveyor or the channel and the recess is made crosswise the axis of the cylinder, whereas the axis of rotation of the cylinder is situated in the symmetry plane of the recess, moreover the axis of rotation of the cylinder is situated in the symmetry plane of the horizontal conveyor and/or the channel, whereas the shutting of the rod-like elements is realized by turning the cylinder.

4. A valve device for separating streams of displacing multi-layered stacks of rod-like elements situated in the area of crossing a horizontal conveyor equipped with a movable band and a channel positioned at an angle equipped with non-movable walls, whereas in the inside dimensions of the passages of the cross sections of the conveyor and the channel are the same, characterised in that in the place of crossing the horizontal conveyor and the channel positioned at an angle is situated a rotary valve in form of a sector of a cylinder of radius (r) corresponding to the width (P) of the horizontal conveyor and the width (K) of the channel and height corresponding to the length of the rod-like elements, whereas an axis of rotation of the valve is the axis of the cylinder and overlaps the line of intersection of a plane of an upper wall of the horizontal conveyor with a plane of a side wall of the channel positioned at an angle.

5. The device according to claim 4 characterized in that the valve constitutes a half of a cylinder.

6. A valve device for separating streams of displacing multi-layered stacks of rod-like elements situated in the area of crossing a horizontal conveyor equipped with a movable band and a channel positioned at an angle equipped with non-movable walls, whereas the inside dimensions of the passages of the cross sections of the conveyor and the channel are not the same, characterised in that in the area of crossing of the horizontal conveyor and the channel positioned at an angle is situated a rotary valve in form of a sector of a cylinder of radius (r') corresponding to width (K') of the channel and of height corresponding to the length of rod-like elements, whereas an axis of rotation of the valve is the axis of the cylinder and overlaps the line of intersection of a plane of a lower wall of the horizontal conveyor with a plane of a side wall of the channel positioned at an angle.

7. The device according to claim 6 wherein the valve constitutes one quarter of a cylinder.

8. The device according to claim 6 or 7 wherein in an upper wall of the horizontal conveyor above channel is situated a pocket shaped by hinge assembled parts of the top wall, which are driven by pressure of the rod-like elements.

9. A valve device for separating streams of displacing multiple-layered stacks of rod-like elements situated in the area of crossing a horizontal conveyor equipped with a movable band and a channel positioned at an angle equipped with non-movable walls, wherein the device is equipped with a rotary in the shape of a cylinder, wherein an axis of rotation of the valve is situated in a symmetrical plane of at least one of a channel and a horizontal conveyor at a distance from the line of intersection of a plane of a side wall of the channel with a plane of a wall and/or of the horizontal conveyor which is equal or slightly bigger than radius (r″), whereas there is a through recess made within the cylinder constituting the rotary valve, wherein the cross section of the recess corresponds to the cross section of channel and/or the horizontal conveyor, whereas the axis of rotation of the valve is situated in the symmetrical plane of the recess.

* * * * *